Nov. 23, 1965
S. E. LEESE ETAL
3,219,146
LUBRICANT DISTRIBUTOR
Filed May 16, 1963
3 Sheets-Sheet 1
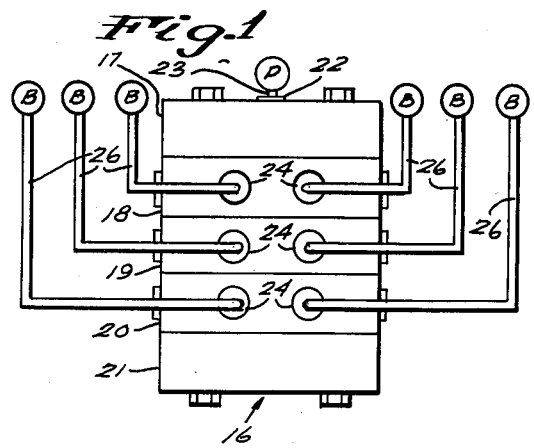
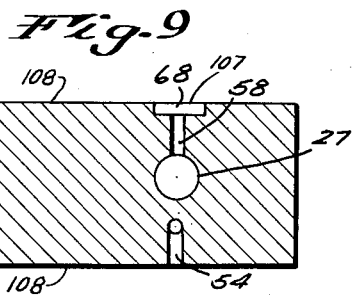
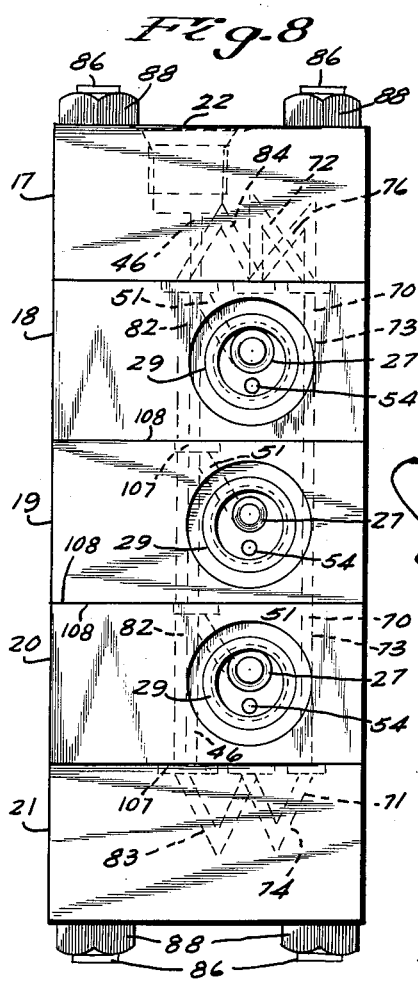
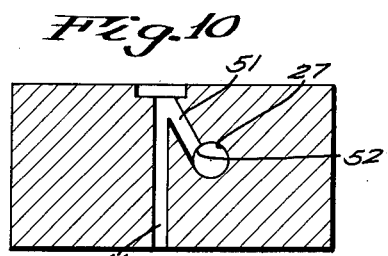
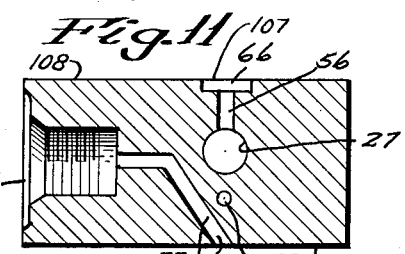
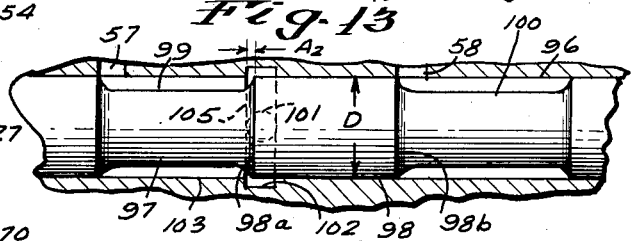
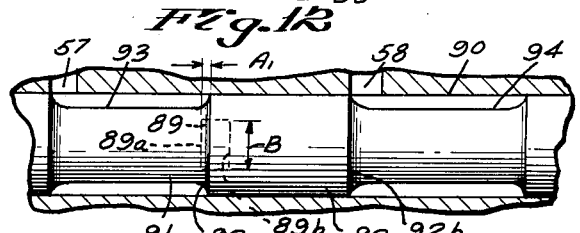
INVENTORS
William F. Behrn
Sydney E. Leese
ATTORNEYS Nov. 23, 1965     S. E. LEESE ETAL     3,219,146
LUBRICANT DISTRIBUTOR
Filed May 16, 1963                      3 Sheets-Sheet 2
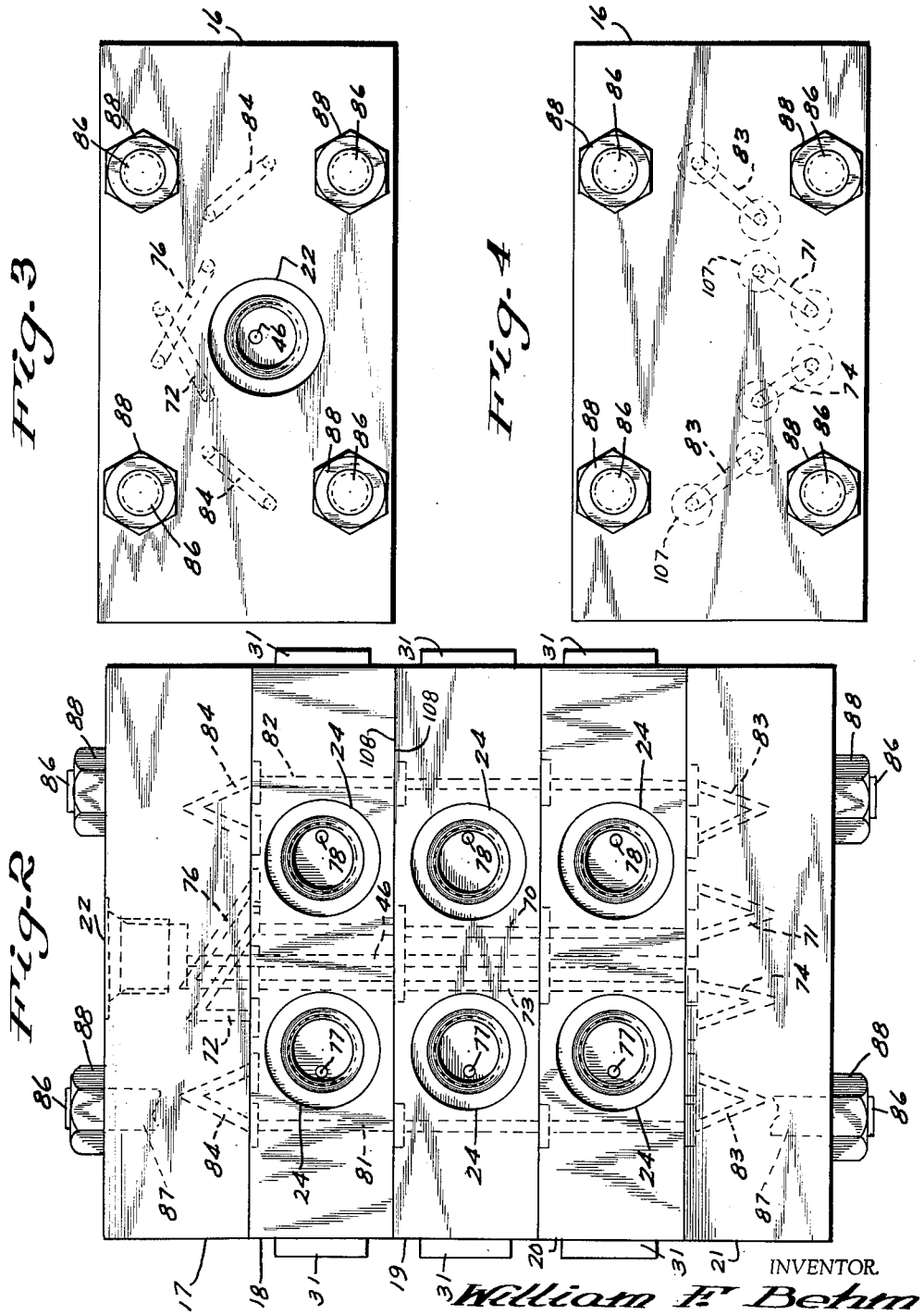
INVENTOR.
William F. Behm
Sydney E. Leese
Hill, Sherman, Meroni, Gross & Simpson
ATTORNEYS

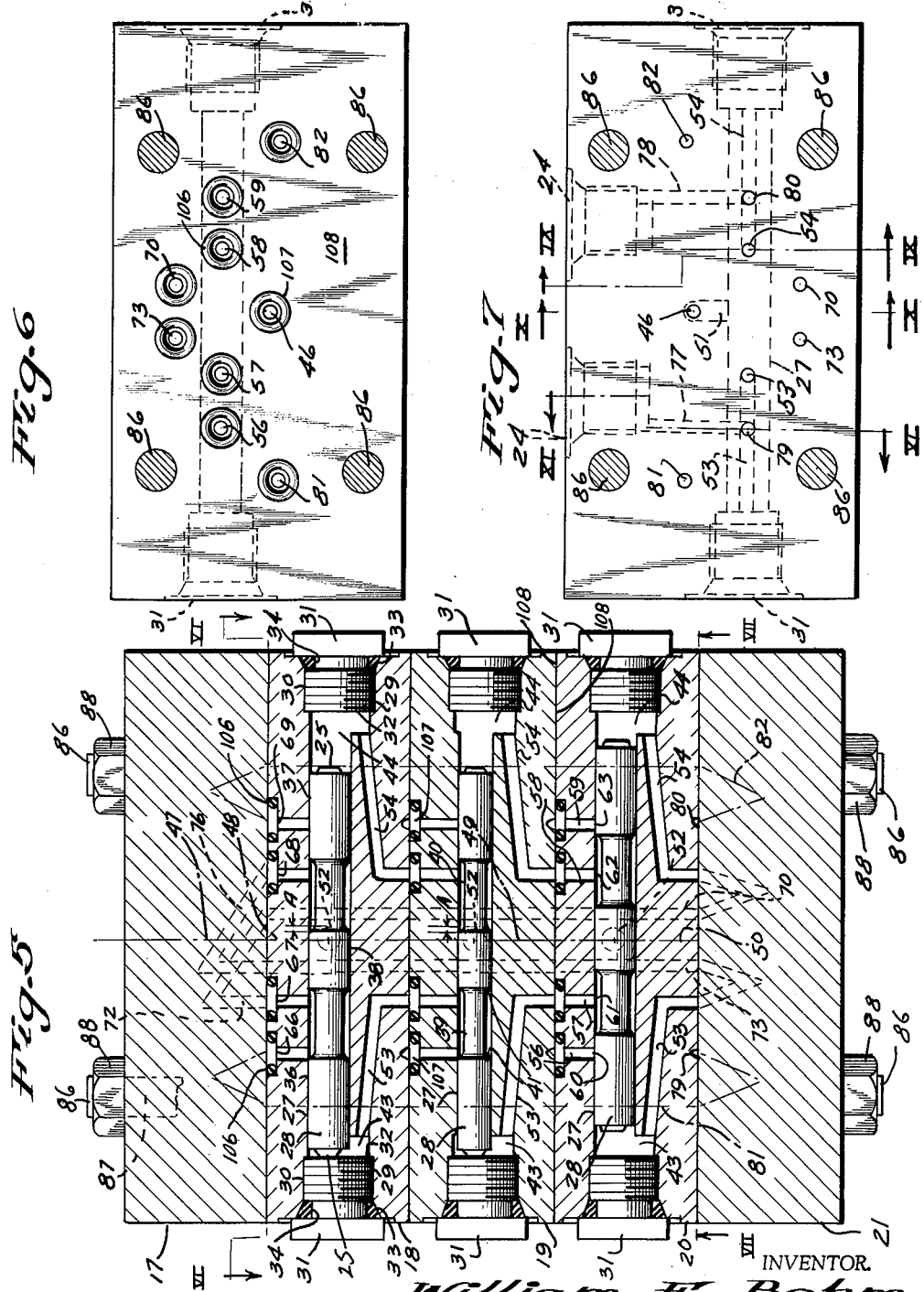

United States Patent Office 3,219,146
Patented Nov. 23, 1965

3,219,146
LUBRICANT DISTRIBUTOR
Sydney E. Leese, Hamburg, and William F. Behm, Cowlesville, N.Y., assignors to Houdaille Industries, Inc., Buffalo, N.Y., a corporation of Michigan
Filed May 16, 1963, Ser. No. 280,987
13 Claims. (Cl. 184—7)

This invention relates to lubrication systems of the type incorporating cycling lubricant distributors and more particularly relates to a new and advantageous porting arrangement for a cycling lubricant distributor which makes it possible to supply predetermined quantities of lubricant to various points of use with greater consistency and precision with respect to the quantities involved than was heretofore available. The arrangement of this invention is relatively simple in design and construction, inexpensive in manufacture and provides for dependable operation.

Lubricant distributors of the cycling type are known in which a distributor block comprises an inlet passageway for receiving pressurized lubricant from a single source and a plurality of outlet passageways for connecting to various points of use, such as bearings or cylinder walls of engines or compressors. Interiorly of the block and in communication with the inlet and one or more of the outlets are formed a plurality of cylinders or bores carrying respectively therein slidable pistons or plungers having a plurality of lands and grooves formed thereon. Other passageways interconnect the various cylinders at different portions thereof, and the lands and grooves of the respective plungers serve as valve mechanisms to distribute or channel the pressurized lubricant from the inlet passageway to the various outlet passageways in succession in metered quantities and in a sequential, cyclic type operation. Examples of the cycling lubricant distributors are found in U.S. Patent 2,146,424 to Dirkes and U.S. Patent 2,792,911 to Harter.

Such lubricant distributors are generally satisfactory but it has been found that serious difficulties and inaccuracies are encountered in supplying measured quantities of lubricant to various points of use when the lubricant pressure required to feed successive points of use varies substantially.

This invention largely overcomes such difficulties and inaccuracies.

According to this invention, a land portion is formed on each plunger for serving as a valve mechanism to control the flow of lubricant into each of the respective cylinders and ultimately to a point of use. Such land portions are dimensioned so as to become operative only when their respective plungers have traveled substantially to a limiting end position and have effectively discharged to a point of use a quantity of lubricant substantially equal to the entire effective displacement of the respective plunger.

An important feature of this invention is in the provision of an inlet porting arrangement in each of the cylinders whereby flow of lubricant into each of the cylinders can be controlled in terms of a time cycle while maintaining extremely close tolerances with respect to the quantity of lubricant supplied to each of the points of use.

Many other features, advantages and additional objects will become manifest to those versed in the art from the detailed description of the invention which follows and the accompanying sheets of drawings in which a preferred embodiment of a cycling lubricant distributor incorporating the principles of the present invention is shown by way of illustrative example.

On the drawings:

FIGURE 1 is a schematic diagram illustrating a lubricating system of which the cycling lubricant distributor of the present invention forms a part;

FIGURE 2 is a front elevational view of a cycling lubricant distributor embodying the principles of the present invention showing the portions in phantom;

FIGURE 3 is a top plan view of the cycling lubricant distributor of FIGURE 2;

FIGURE 4 is a bottom plan view of the distributor of FIGURE 2;

FIGURE 5 is a front sectional view of the distributor of FIGURE 2;

FIGURE 6 is a top plan view of the distributor of FIGURE 5 with the inlet block unit removed;

FIGURE 7 is a bottom plan view of the distributor of FIGURE 5 with the end block unit removed;

FIGURE 8 is an end elevational view of the distributor of FIGURE 2;

FIGURE 9 is a cross-sectional view of an intermediate block unit taken along lines IX—IX of FIGURE 7;

FIGURE 10 is a cross-sectional view of an intermediate block unit taken along lines X—X of FIGURE 7;

FIGURE 11 is a cross-sectional view of an intermediate block unit taken along lines XI—XI of FIGURE 7;

FIGURE 12 is a fragmentary front sectional view of an intermediate block unit illustrating another embodiment of the present invention; and FIGURE 13 is similar to FIGURE 12 and illustrates yet another embodiment of the present invention.

As shown on the drawings:

Although the principles of the present invention are of utility in any cycling lubricant distributor incorporating slidable plungers having lands and grooves formed thereon for serving as valve mechanisms a particularly useful application is made to cycling lubricant distributors of the block unit type and an illustrative embodiment herein shown consists of a stack of identical intermediate block units having an inlet block unit and an end block unit mounted at either ends of the stack.

A cycling lubricant distributor embodying the principles of the present invention is shown generally at 16 in FIGURE 1 wherein is illustrated a block-unit type cycling lubricant distributor comprising an inlet block-unit 17, intermediate block-units 18–20 and an end block-unit 21.

Connected at one end to a main inlet 22 in the inlet block-unit 17 for supplying pressurized lubricant to the distributor 16 is a supply conduit 23 which is connected at its opposite end to a lubricant pump as at P. A pair of outlets 24, 24 are provided in each of the intermediate block-units 18–20 and are connected respectively by means of a discharge conduit as at 26 to a point of use, such as the bearing of a machine, indicated at B.

In many lubrication systems incorporating cycling lubricant distributors, extremely high lubricant pressures are required to feed lubricant to the various points of use.

For example, cycling lubricant distributors may be used in systems requiring a back pressure, that is, a pressure in a discharge conduit 26 sufficient to deliver lubricant to a point of use B, in the order of and even exceeding several thousand pounds per square inch. Further, it is not uncommon to have a single cycling distributor delivering lubricant to points of use having back pressures which differ from each other in substantial amounts. For example, a distributor may be connected to one point of use having a back pressure of 3,000 pounds per square inch and may be connected to another point of use having a back pressure in the order of only several hundred pounds per square inch.

The pump P is preferably of the positive displacement type, capable of pumping lubricant against any given pressure, limited only by the structural limitations of the pump frame and the maximum allowable working pressures of the other components which comprise the lubrication system.

Referring to FIGURES 2-11, and having particular reference to FIGURE 5, the block-unit or sandwich type cycling lubricant distributor illustrated in the drawings is particularly characterized as comprising a stack of identically constructed intermediate block-units 18-20. Each of the block-units 18-20 includes a cylinder or bore 27 which carries therein a slideable piston or plunger member 28 having a pair of end caps 25, 25. An enlarged diameter portion 29 is formed at both ends of each of the cylinders 27 and comprises a threaded side wall portion 30 for receiving a complementarily threaded stop or plug 31 having a solid end wall 32 disposed perpendicularly to the axis of its respective cylinder 27. An O ring or similar sealing element 33 is inserted about a neck portion 34 of each of the plugs 31 for preventing leakage of lubricant at the plugs 31 under the extremely high pressures to which the lubricant may be subjected within the cylinders 27.

The plungers 28 in lubricant distributors of the cycling type perform the function of controlling or metering the flow of pressurized lubricant from the pump P to the various points of use, and in this respect certain lands and grooves are formed on the plungers which cooperate with certain passageways formed in the block and in communication with the cylinders and the outlets to perform this metering operation. In the embodiment illustrated, the plungers 28 comprise a pair of identical end lands 36 and 37 and a center land 38 having an axial length which is less than the axial length of the end lands 36 and 37. The center land 38 is separated from the end lands 36 and 37 respectively by identical reduced diameter groove portions 39 and 40 having arcuately shaped outwardly diverging transition portions 41 extending to adjacent lands. The plungers 28 are machined to close tolerances to provide a sliding but sealing relation in the cylinders 27 such that lubricant can circulate freely about groove portions 39 and 40 but cannot circulate axially within a cylinder 27 past land portions 36, 37 and 38.

A reduced diameter axially extending embossment or end cap 35 is formed at each end of the plungers 28 and is adapted to abut an end wall 32 of a corresponding plug 31 when the plunger 28 is moved to its limiting end position in the direction of a respective end cap 25. By varying the axial length of the end caps 25 the limiting end positions of the plungers, that is, the positions of the plungers 28 which obtain when they have moved axially within the cylinders 27 into abutting engagement with the plugs 31, can be effectively controlled. The above can also be obtained by controlling the length of the plugs 31.

At the ends of the cylinders 27, chambers 43 and 44 are formed between the ends of the plungers 28 and the end walls 32 of the plugs 31. Even when the plungers 28 have moved to their limiting end positions, the respective chambers 43 and 44 are not eliminated, although reduced in volume.

In a cycling lubricant distributor of the type illustrated, a substantial number of identical intermediate block-units may be stacked together to feed a correspondingly substantial number of points of use. It is common to stack as many as 5 to 8 intermediate block-units together in a single distributor block. In the illustrated embodiment, each intermediate block-unit comprises two outlets 24, 24, and if a total of 8 intermediate block-units were stacked together in a single distributor block a total of 16 individual points of use could be lubricated from a single distributor block. If desirable, two or more outlets can be manifolded together exteriorly of the distributor block to feed a single point of use, and further, one of the outlets could be connected to the inlet of another distributor block to have its delivered output of lubricant once again metered to an additional plurality of points of use. For illustrative purposes only, a distributor block 16 comprising only three intermediate blocks 18, 19 and 20 is shown in the drawings.

The main inlet 22 of the inlet block-units 17 is in open communication with a main lubricant inlet passageway 46 which extends vertically through the inlet-block 17 and the intermediate block-units 18, 19 and 20. The main inlet passageway 46 actually comprises a plurality of concentrically aligned passageways 47, 48, 49 and 50 formed respectively in block-units 17, 18, 19 and 20, although it will be understood that when the block-units 17-20 are in an assembled or stacked condition as illustrated, the main inlet passageway 46 comprises a single non-interrupted lubricant flow passageway from the inlet 22 to the end block-unit 21.

As best illustrated in FIGURES 8 and 10, an inlet passageway 51 is formed in each of the intermediate block-units 18-20 which communicates the main inlet passageway 46 with an inlet port 52 in open communication with a cylinder 27. Referring to FIGURE 5, it will be noted that the inlet ports 52 are situated intermediate the ends of the cylinders 27 and project circularly shaped openings in the walls of the cylinders 27.

Also formed within each of the intermediate block-units 18-20 are a pair of two-way passageways 53 and 54 in open communication respectively with corresponding chambers 43 and 44 and extending angularly inwardly and then downwardly to terminate at the mating face of an adjacent block-unit.

Two pairs of spaced parallel vertically extending connecting passageways are shown at 56, 57, 58 and 59 as being formed in each of the intermediate block-units 18-20 and extending from respective cylinders to top mating faces of respective block-units. Passageways 56-59 terminate at their lower ends respectively at connecting ports 60-63 which open into top portions of their respective cylinders 27 and at their upper ends at transfer ports 66-69. Connecting passageways 56 and 57 are spaced axially outwardly and are formed on one side of inlet ports 52 whereas passageways 58 and 59 are situated on an opposite side of inlet ports 52 and in spaced relation thereto corresponding to similarly spaced passageways 56 and 57. Passageways 56 and 57 are mutually spaced a distance not to exceed the axial length of the grooves 39 formed on the plungers 28, and likewise ports 58 and 59 are spaced a distance not to exceed the length of grooves 40. It will be noted from the drawings that communication of passageways 56-57 or passageways 58-59 obtains at alternate limiting end positions of the plungers 28.

The lower portions of two-way passageways 53 and 54 of intermediate block-units 18 and 19 are concentrically aligned and in fluid communication with connecting passageways 57 and 58 of block-units 19 and 20 respectively. In order to attain cyclic operation of the distributor 16, as will become apparent hereinafter, it is also necessary that two-way passageways 53 and 54 of the lowermost intermediate block-unit in the stack, and in this instance block-unit 20, also be in fluid communication with the connecting passageways of the topmost intermediate block-unit in a stack, in this instance block-unit 18, but on opposite sides of the inlet ports 52 with respect to the connection of two-way passageways 53 and 54 of block-units 18 and 19 to connecting passageways 57 and 58 of block-units 19 and 20. In order to provide communication of the lower portion of passageway 54 of block-units 20 to connecting passageway 57 of block-unit 18, a crossover passageway 70 extends from the end block-unit 21 to the inlet block-unit 17, and as illustrated in FIGURES 2 and 4, comprises a V-shaped portion 71 in the end block-unit 21 and a distorted V-shaped portion 72 in the inlet block-unit 17. It will be noted in FIGURES 6 and 7 that cross-over passageway 70 extends vertically through block-units 18, 19 and 20 on an opposite side of cylinders 27 in respect of the main inlet passageway 46.

In order to provide communication of the lower portion of passageway 53 of block-unit 20 to connecting passageway 58 of block-unit 18, another cross-over passageway 73 extends from the end block-unit 21 to the inlet block-unit 17 and forms a V-shaped portion 74 and a distorted V-shaped portion 76 in end block-unit 21 and inlet block-unit 17 respectively.

The term "cross-over" is applicable to passageways 70 and 73 since it will be noted that these passageways connect respectively a two-way passageway in one block-unit on one side of inlet port 52 to a connecting passageway in another block-unit on an opposite side of inlet ports 52.

Each of the intermediate block-units 18–20 has formed therein a pair of outlet passageways 77 and 78, and as best illustrated in FIGURE 7, passageways 77 and 78 extend angularly upwardly from the lower mating face of their respective block-units and from a point in vertical alignment with the axis of cylinders 27 and their respective connecting passageways 56 and 59, and then extend horizontally to an outlet 24. As best illustrated in FIGURE 5, ports 79 and 80 of outlet passageways 77 and 78 of intermediate block-units 18 and 19 overlie and are in fluid communication with connecting passageways 56 and 59 of block-units 19 and 20 respectively. Such arrangement provides for discharge of lubricant from an outlet situated in the same block-unit as the respective plunger that metered such lubricant. In order to provide a similar arrangement for block-unit 20, as will become apparent hereinafter, it is necessary to provide fluid communication between connecting passageways 56 and 59 of the inlet block-unit 17 and outlet passageways 77 and 78 of the end block-unit 21, as best illustrated in FIGURES 2 and 5. For that purpose, a pair of branch passageways 81 and 82 are formed in the distributor 16 and extend vertically through intermediate block-units 18–20 to terminate at the ends thereof in V-shaped portions 83 and 84 (FIGURE 8) formed respectively in end block-unit 21 and inlet block-unit 17.

In order to retain the various block-units of block 16 in leak-proof assembled relation, a plurality of bolts 86 extend vertically through the entire block 16 and are threaded at their end portions as at 87 to receive complementarily threaded tightening nuts as at 88.

Also, as clearly shown in the drawings, a plurality of O rings or similarly shaped annular seals as at 106, which may be constructed similarly to the O rings 33, are disposed in counterbores 107 formed in mating faces 108 of the adjacent block-units 17–21 to provide a seal between the openings of the various passageways 46, 56–59, 70, 73, 80 and 81 of the respective block-units which are in register with one another. The seal rings 106 are maintained in a state of compression between a shoulder 109 formed in each of the counterbores 107 and the mating face 108 of the adjacent block-unit by means of the clamping action of the bolts 86.

In order to understand the cylic operation of a lubricant distributor of the type illustrated, it will be assumed that the inlet 22 of the distributor block 16 has been connected to a source of pressurized lubricant and the various outlets 24 have been connected to respective points of use. Assuming the starting position of the parts of the distributor block 16 are as illustrated in FIGURE 5, incoming lubricant is admitted through the inlet 22 from whence it fills the main inlet passageway 46 and the inlet passageways 51 of each of the intermediate block-units 18–20. As illustrated, the center land 38 of the plunger 28 in block-unit 20 is completely blocking its respective inlet port 52, thereby preventing lubricant from entering the cylinder 27 of block-unit 20. The center land 38 of plunger 28 in block-unit 19 is only partially blocking its respective inlet port 52 and consequently lubricant will be admitted from the inlet passageway 51 into the cylinder 27 between the center land 38 and the end land 37 from whence it will enter the connecting passageway 58 to be conveyed through the two-way passageway 54 of block-unit 18 to the chamber 44 of block-unit 18. The admission of pressurized lubricant into the chamber 44 of block-unit 18 would have the effect of moving its respective plunger 28 in a leftwardly direction as viewed in FIGURE 5, but as is illustrated, plunger 28 of block-unit 18 is situated in its extreme left limiting end position. Consequently, further movement of plunger 28 of block-unit 18 will not take place at this time.

In block-unit 18, the center land 38 of the plunger 28 is only partially blocking its respective inlet port 52, and the pressurized lubricant will enter the groove portion 40 between lands 37 and 38 from whence it will be conveyed upwardly through connecting passageway 68 through the cross-over passageway 73 to the two-way passageway 53 of block-unit 20 from whence it will enter the chamber 43 thereof. The build-up of pressurized lubricant in the chamber 43 of block-unit 20 will urge its respective plunger 28 in a rightward direction. Assuming that the entire block 16 has been filled with lubricant due to previous operation, lubricant which fills chamber 44 of block-unit 20 will now be forced to flow through two-way passageway 54 of block-unit 20, through cross-over passageway 70 to connecting passageway 57 of block-unit 18, through the groove portion 39 of block-unit 18, through connecting passageway 56 of block-unit 18, and then downwardly through branch passageway 81 to outlet passageway 78 of block-unit 20.

After plunger 28 of block-unit 20 has moved sufficiently rightwardly, land 38 thereof will uncover a portion of its respective inlet port 52, and the pressurized lubricant will be conveyed through groove portion 39 of the plunger 28 to connecting passageway 57 of block-unit 20 from whence it will be conveyed to two-way passageway 53 of block-unit 19. The pressurized lubricant will then fill chamber 43 of block-unit 19 and as a result its respective plunger 28 will be urged rightwardly, forcing the lubricant in chamber 44 of block-unit 19 to be discharged through two-way passageway 54 of block-unit 19 through connecting passageway 58 of block-unit 20, through land portion 40 of block-unit 20 and thence through connecting passageway 59 of block-unit 20 from whence it will be conveyed through outlet passageway 78 of block-unit 19 to its respective outlet 24.

After the plunger 28 of block-unit 19 has moved sufficiently rightwardly, its respective land 38 will partially uncover its respective inlet port 52 to allow pressurized lubricant to be conveyed from groove portion 39 of block-unit 19 to communicating passageway 57 of block-unit 19 from whence it will pass through two-way passageway 53 of block-unit 18 into chamber 43 of block-unit 18. The pressurized lubricant in chamber 43 of block-unit 18 will urge its respective plunger 28 rightwardly, thereby discharging the lubricant in chamber 44 of block-unit 18 through its respective two-way passageway 54 into connecting passageway 58 of block-unit 19, through groove portion 40 of block-unit 19, and thence through connecting passageway 59 of block-unit 19 from whence it is conveyed through outlet passageway 78 of block-unit 18 to its respective outlet 24.

After plunger 28 of block-unit 18 has moved sufficiently rightwardly, its respective center land 38 will partially uncover its respective inlet port 52 to allow pressurized lubricant to pass through groove portion 39 of block-unit 18, through connecting passageway 57 of block-unit 18, and thence through cross-over passageway 70 to the two-way passageway 54 of block-unit 20. The pressurized lubricant will then fill chamber 44 of block-unit 20 thereby urging its respective plunger 28 in a leftward direction. Such movement of the plunger 28 of block-unit 20 will force the lubricant in chamber 43 of block-unit 20 to be discharged through two-way passageway 53 of block-unit 20, through cross-over passageway 73 and into connecting passageway 58 of block-unit 18, from whence it will pass through groove portion 40 of block-unit 18 through connecting passageway 59 of block-unit 18, and thence through branch passageway 82 to the outlet passageway 78 of block-unit 20 from whence it will discharge through its respective outlet 24.

When the plunger 28 of block-unit 20 has moved sufficiently leftwardly, its respective center land 38 will partially unblock its respective inlet port 52 to allow pressurized lubricant to pass through groove portion 40 of block-unit 20, and thence through connecting passageway 58 of block-unit 20 into two-way passageway 54 of block-unit 19. Chamber 44 of block-unit 19 will then fill with pressurized lubricant, thereby urging plunger 28 of block-unit 19 in a leftward direction. As this movement occurs, the lubricant in chamber 43 of block-unit 19 is discharged through two-way passageway 53 of block-unit 19, through connecting passageway 57 of block-unit 20, and thence through groove portion 39 of block-unit 20 into connecting passageway 56 of block-unit 20 from whence it is conveyed to the outlet passageway 78 to its respective outlet 24.

As the plunger 28 of block-unit 19 moves sufficiently leftwardly, its respective center land 38 will partially uncover its respective inlet port 52 to permit pressurized lubricant to enter its respective groove portion 40, and then to be conveyed through connecting passageway 58 of block-unit 19 into two-way passageway 54 of block-unit 18. As this occurs, chamber 44 of block-unit 18 will become filled with pressurized lubricant, thereby urging plunger 28 of block-unit 18 in a leftward direction. As this leftward movement occurs, the lubricant in chamber 43 of block-unit 18 is discharged through two-way passageway 53 of block-unit 18, from whence it is conveyed through connecting passageway 57 of block-unit 19, through groove portion 39 of block-unit 19, and into connecting passageway 56 of block-unit 19, from whence it passes through outlet passageway 77 of block-unit 18 out of its respective outlet 24.

Thus a complete "around-the-circle" operation or cycle of the lubricant distributor block 16 has been described.

As mentioned in preceding paragraphs, cycling lubricant distributors may be connected to a plurality of points of use, each of which may require a different back pressure, that is, a different lubricant pressure in its discharge conduit 26 to properly feed the point of use. Consequently, as the distributor block 16 operates in an around-the-circle sequence, the chamber 43 or 44 of one intermediate block-unit on a given application might discharge lubricant at a back pressure of 1,000 pounds per square inch and the chamber of the next succeeding cylinder might discharge lubricant at a back pressure of 500 pounds per square inch or possibly 2,000 pounds per square inch.

As mentioned, the pump P is preferably of the positive displacement type and will develop sufficient pressure in the main inlet passageway 46 to effectively deliver lubricant against any back pressure which may be encountered. Further, under normal operating conditions, the quantity of lubricant to be delivered to a given point of use can be quite accurately predetermined as equivalent to the displacement of the "pumping" end of a plunger as it moves from one limiting end position to its opposite limiting end position during a pumping stroke.

However, it has been found that substantial deviations from predetermined quantities of lubricant to be supplied to various points have been encountered in many applications. The reason or reasons for these deviations were not readily apparent, and part of the present invention involves the applicants' discovery of the reasons for such deviations and changes in structure for substantially eliminating the problem and for ensuring predetermined quantities of lubricant to all points of use.

It was determined that the quantity of lubricant to be supplied to a given point of use would decrease in a given application if the back pressure required for that point of use was substantially higher than the back pressure required to supply lubricant to the next succeeding point of use. If the converse were true, that is, if the back pressure required for the next succeeding point of use was greater than the back pressure required for the preceding point of use, then the preceding point of use would be supplied with its full predetermined quantity of lubricant based on the effective displacement of its respective plunger.

Accordingly, the present invention involves improvements in cycling lubricant distributors of the type described so as to ensure predetermined quantities of lubricant, within tolerances of three percent and even less, to all points of use, including those points which require greater back pressure than their next succeeding point of use.

In prior art cycling lubricant distributors, the land of the plunger which forms the valve mechanism for the inlet port, has been dimensioned to largely or completely unblock the inlet port during an "open-port" position of the plunger. For example, referring to FIGURE 5, in prior art devices the center land 38 of the plunger 28 in block-unit 18, as the parts are illustrated, would be dimensioned to largely or completely unblock the inlet port 52 when the plunger 28 is in the limiting end position shown.

It is because of this design feature, and certain disadvantages inherent therein, that prior art devices have often failed to supply a substantially full predetermined quantity of lubricant to a point of use, when the next succeeding point of use required a lower back pressure.

In order to appreciate fully the concepts involved, assume that the distributor block 16 is connected to a source of pressurized lubricant for operation. Further assume that the point of use which is connected to the outlet passageway 77 of block-unit 20 requires a back pressure of 3,000 pounds per square inch, and that the point of use which is connected to outlet passageway 78 of block-unit 19 requires a back pressure of only 1,000 pounds per square inch. In accordance with the operation of the distributor block 16, lubricant would be admitted through inlet port 52 of block-unit 18 to pass through its respective groove portion 40, through cross-over passageway 73, and thence into two-way passageway 53 of block-unit 20 to enter chamber 43 of block-unit 20.

The lubricant in this chamber 43 will act to urge the plunger 28 of block-unit 20 rightwardly to discharge the lubricant in chamber 44 of block-unit 20 through a series of passageways to outlet passageway 77 of block-unit 20, which is assumedly connected to a 3,000 pound per square inch back pressure. The plunger 28 will therefore resist movement until the lubricant pressure in the main inlet passageway 46 has been increased by the pump P to approximately 3,000 pounds per square inch, and then the plunger 28 of block-unit 20 will move in a rightward direction.

After this plunger 28 has moved sufficiently rightwardly so that the center land 38 has "cracked" the inlet port 52 of block-unit 20, the lubricant in the main inlet passageway 46 is free to pass through the groove portion 39 of block-unit 20 into the two-way passageway 53 of block-unit 19 and thence into the chamber 43 of block-unit 19 to urge its respective plunger 28 rightwardly. The lubricant pressure in the main inlet passageway 46 just before inlet port 52 of block-unit 20 is cracked is approximately 3,000 pounds per square inch, but as soon as this port is cracked the lubricant in the main inlet passageway 46 will immediately be diverted from the inlet port 52 of block-unit 18 into the inlet port 52 of block-unit 20 and will immediately drop in pressure from about 3,000 pounds per square inch to approximately 1,000 pounds per square inch, since the back pressure against which the lubricant passing through inlet port 52 of block-unit 20 has to operate is only 1,000 pounds per square inch, the back pressure against which chamber 44 of block-unit 19 is connected.

Therefore, under the circumstances, rightward movement of the plunger 28 of block-unit 20 will immediately stop as soon as inlet port 52 of block-unit 20 is cracked. Under these conditions, plunger 28 of block-unit 20 will not move to its rightway limiting end position and the point of use connected to chamber 44 and outlet passageway 78 of block-unit 20 will not receive its full predetermined quantity of lubricant.

In accordance with the principles of the present invention, the center lands 38 of the plungers 28 are dimensioned such that their respective inlet ports 52 are not cracked until their respective plungers 28 have traveled about 97 percent of their full stroke from one limiting end position to an opposite limiting end position. Consequently, in the event that a plunger 28 does stop moving as soon as its respective land 38 has cracked its corresponding inlet port 52, the plunger 28 has effectively discharged an amount of lubricant equal to at least 97 percent of its predetermined displacement.

It has been determined that only partial unblocking of the inlet port 52 does not adversely affect the operation of a cycling lubricant distributor because of the very low flow rates involved, and in effect, this occurs in prior art devices when succeeding points of use require a reduced back pressure. When the plunger stops in a prior art device due to premature diverting of the lubricant in the main inlet passageway, however, the plunger has traveled in some cases only about 60 percent of its full stroke, thereby reducing the quantity of lubricant to a given point of use in some cases by as much as 40 percent.

Further in accordance with the principles of the present invention there is provided another embodiment of a land-inlet port arrangement illustrated in FIGURE 12, wherein is shown a square-shaped inlet port 89 having end walls 89a and 89b and opening into a cylinder 90 which carries a plunger 91 having formed thereon a center land 92 defining end walls 92a and 92b and groove portions 93 and 94.

Assume that the plunger 91 is being acted upon by pressurized lubricant to move in a rightward direction, and further assume that the back pressure against which plunger 91 is acting is greater than the back pressure against which the next succeeding plunger will act.

As the land 92 cracks or unblocks the inlet port 89 sufficient so that the pressure drop of the lubricant through the inlet port 89 plus the back pressure against which the next succeeding plunger will operate is less than the back pressure against which plunger 91 is operating, the plunger 91 will stop its rightward movement. If $A_1$, as shown in FIGURE 12 represents the axial length of the inlet port 89 which is unblocked by the land 92 when the plunger 91 comes to a halt the area of inlet opening of the inlet port 89 feeding the groove portion 93 is approximately equal to the dimension $A_1$, times the reflected height B of the inlet port 89. It will be understood that to achieve this area $A_1 \times B$ using the square inlet port 89 as illustrated in FIGURE 12, the dimension $A_1$, which is the axial dimension of the unblocked portion of the inlet port, need not be as great as need be the dimension A when using a circular inlet port such as inlet port 52 (see A in FIGURE 5). As a result, it has been determined that in using the inlet port arrangement as illustrated in FIGURE 12, the land 92 need not begin to unblock the inlet port 89 until the plunger 91 has traveled about 98 percent of its full stroke travel, with the result that predetermined quantities of lubricant can be supplied to all points of use regardless of variances in back pressure within tolerances of 2 percent.

Referring now to FIGURE 13, another embodiment of a land-inlet port arrangement as contemplated by the present invention is illustrated wherein a cylinder 96 of a cycling lubricant distributor 16 (FIGURE 1) carries a plunger 97 having a center land 98 defining end walls 98a and 98b and groove portions 99 and 100. A circular inlet port 101 is shown opening into the cylinder 96, and in open communication with the inlet port 101 and the cylinder 96 is a circumferentially continuous annular indent or ring groove 102 opening into a cylinder wall 103 of the cylinder 96. The axial length of the ring groove 102, that is, the dimension extending parallel to the longitudinal axis of the cylinder 96, is approximately equal to the reflected diameter of the circular inlet port 101.

Assume that the plunger 97 is being acted upon by pressurized lubricant to move in a righward direction as viewed in FIGURE 13, and further assume that the back pressure against which plunger 97 is acting is greater than the back pressure against which the next succeeding plunger will act.

As the land 98 moves past a leading end wall 105 of the ring groove 102 sufficient so that the pressure drop of the lubricant through an area defined by the leading end wall 105 and the end wall 98a of the land 98 plus the back pressure against which the next succeeding plunger will operate is less than the back pressure against which plunger 97 is operating the plunger 97 will stop its rightward movement. If $A_2$ equals the axial length of the ring groove 102 which is unblocked by the land 98 when the plunger 97 comes to a halt, the effective area of the inlet opening from the inlet port 101 to the groove portion 99 is approximately the dimension $A_2$ multiplied by the diameter D of the land 98 times $\pi$. Since the effective area of the inlet opening in the arrangement shown in FIGURE 13 must be substantially equal to the effective area of the inlet opening of the land-inlet port arrangement of FIGURE 5, it will be readily apparent that the dimension $A_2$ of FIGURE 13 need not be as great as the dimension A of FIGURE 5. As a result, it has been determined that in using the inlet port arrangement of FIGURE 13, the land 98 need not begin to unblock the ring groove 102 until the plunger 97 has traveled about 99 percent of its full stroke, with the concomitant result that predetermined quantities of lubricant can be supplied to various points of use regardless of differences in back pressure within tolerances of only one percent.

For purposes of illustration only, and not for purposes of limitation, the following numerical examples of the tolerances available within the concepts of the present invention are hereinafter provided. In using a cycling lubricant distributor 16 as illustrated in FIGURE 5, dimensioned to provide a 0.310" full stroke for each of the plungers 28, that is, from one limiting end position to an opposite limiting end position, satisfactory cycling results of the device are obtainable when the dimension A is 0.010", or approximately 3 percent of the full stroke. Consequently, in discharging lubricant to various points of use having differences in back pressure, tolerances of 3 percent are obtainable.

In using the same device illustrated in FIGURE 5, with the exception that the land inlet port arrangement was modified to that illustrated in FIGURE 12, the dimension $A_1$ was kept to about 0.0067" or about 2 percent of the full stroke resulting in tolerances of 2 percent. In using the arrangement of FIGURE 13, the dimension $A_2$ was kept to about 0.0033" or about 1 percent of the full stroke, resulting in tolerances of 1 percent.

Stated differently, the preferred design relationships contemplated in the present invention are such that as the plungers move past the point intermediate the limiting end positions thereof from a first limiting end position to a second limiting end position, the distance from which the plunger is from the second limiting end position when the land 38 starts to open the inlet port divided by the total stroke should be less than 15%, preferably less than 10% or most preferably on the order of 5% or less, 3% being used in the embodiment of FIGURE 5, 2% in the embodiment of FIGURE 12, and 1% in the embodiment of FIGURE 13.

The above relationships apply even though various points of use may require different quantities of lubricant per stroke of a respective plunger, which can be easily accommodated by varying the diameter of the various plungers accordingly. For example, it is readily apparent in FIGURE 5 of the drawings that the diameter of plunger 28 of block-unit 19 is less than the diameter of plungers 28 in block-units 18 and 20. It is only the stroke of the plunger which affects the results obtainable in the present invention, and more particularly, that percentage of the full stroke of the plunger as its limiting end position obtains which is required to unblock sufficient inlet port opening to halt movement of a plunger when the next succeeding plunger is connected to a point of use requiring a reduced back pressure.

A secondary advantage of the land-inlet port arrangement of the present invention, aside from the advantages described in the preceding paragraphs, resides in its effective reduction the deleterious effects of instantaneous surges in the supply line feeding the various points of use. Occasionally, for example, when an air bubble is intrapped in the highly pressurized lubricant, there is a tendency in a lubrication system of the type described for the lubricant to exert a momentary backward surge in the direction of the distributor 16. A surge might be exerted on a plunger which is moving in a "pumping stroke" or it may be exerted upon a plunger at rest at or near its limiting end position. Such a surge will be communicated backwards through the distributor to be exerted on a plunger to move the plunger in a direction opposite its existing or next intended direction of movement. Such movement will surge or "bounce" the lubricant filling the chamber at the opposite end of the plunger and back-feed into the main inlet passageway 46. By means of the present invention, the limited effective area of the inlet openings of the cylinders into the inlet passageways 51 and, accordingly, the main inlet passageway 46, may dampen such surges sufficiently to prevent sudden instantaneous effect on the lubricant pressure in the main inlet passageway 46.

Another, albeit less important, advantage of the land-inlet port arrangements illustrated in FIGURES 12 and 13 resides in the reduced pressure drop across the inlet ports 89 and 101 respectively, when their corresponding plungers move to a full limiting end position, as obtains when the back pressure against which they may be operating is not as great as the back pressure against which the next succeeding plunger may operate. It will be apparent that such reduction in pressure drop would permit smaller pressure differentials between the back pressure of the plunger operating through its pumping stroke and the reduced back-pressure against which the next succeeding plunger must operate, while allowing the "now-acting" plunger to move to its full limiting end position during its pump stroke, thereby discharging a completely full quantity of lubricant to its point of use.

Although minor modifications might be suggested by those versed in the art, it should be understood that we wish to embody within the scope of the patent warranted hereon all such modifications as reasonably come within the scope of our contribution to the art.

We claim as our invention:
1. A cyclic lubricant distributor comprising,
   a block having a plurality of cylinders formed therein each having two outlets,
      passageway means connecting the ends and the outlets of each cylinder to another cylinder,
   a main inlet passageway for supplying lubricant under pressure,
      each of said cylinders having an inlet port connected to the main inlet passageway,
   a plunger in each cylinder arranged to be automatically shifted reciprocally back and forth a full stroke from one limiting end position to another limiting end position, and land portions on said plungers normally covering said inlet ports,
      said land portions being movable across said inlet ports for uncovering said ports to alternately connect the cylinders at one end to lubricant under pressure and to connect the cylinders at their opposite ends to outlets in other cylinders through said passageway means,
      said land portions being dimensioned to uncover said ports only when the distance of the plunger from one limiting end position divided by the distance of the full stroke is less than 0.10 and preferably less than 0.05.

2. A lubricant distributor comprising,
   a distributor body having an inlet,
   a plurality of outlets,
   a plurality of elongated bores and a pair of spaced stop means at the opposite ends of each of said bores,
   an inlet passageway connected to said inlet,
   a plurality of piston members carried respectively in each of said bores and reciprocably movable endwise a full stroke between limiting end positions defined by said stops,
   lubricant passageway means, including valve means, interconnecting said inlet passageway,
   said bores and said outlets and arranged such that pressurized lubricant applied to said inlet will produce successive sequential reciprocating movement of said piston members from one of their respective limiting end positions to the other,
      said valve means comprising a plurality of individual valve members associated respectively with one of said bores and each operative in response to the position of its respective piston member in its bore to establish a flow path through such valve member to admit lubricant into its respective bore from said inlet passageway,
      each of said valve members being so constructed and arranged as to be operative to establish said flow path only when its respective piston member is situated with respect to one of its respective stops a distance less than 15 percent of the length of said full stroke of its respective piston member.

3. The lubricant distributor as defined in claim 2 in which each of said valve members are so constructed and arranged as to be operative to establish said flow path only when its respective piston member is situated with respect to one of its respective stops a distance less than 10 percent of the length of said full stroke of its respective piston member.

4. The lubricant distributor as defined in claim 2 in which each of said valve members are so constructed and arranged as to be operative to establish said flow path only when its respective piston member is situated with respect to one of its respective stops a distance less than 5 percent of the length of said full stroke of its respective piston member.

5. The lubricant distributor as defined in claim 2 in which each of said valve members are so constructed and arranged as to be operative to establish said flow path only when its respective piston member is situated with respect to one of its respective stops a distance less than 3 percent of the length of said full stroke of its respective piston member.

6. The lubricant distributor as defined in claim 2 in which each of said valve members are so constructed and arranged as to be operative to establish said flow path only when its respective piston member is situated with respect to one of its respective stops a distance less than 2 percent of the length of said full stroke of its respective piston member.

7. The lubricant distributor as defined in claim 2 in which each of said valve members are so constructed and arranged as to be operative to establish said flow path only when its respective piston member is situated with respect to one of its respective stops a distance less than 1 percent of the length of said full stroke of its respective piston member.

8. lubricant distributor comprising,
a distributor body having an inlet,
a plurality of outlets,
a plurality of elongated bores and a pair of spaced stop means at the opposite ends of each of said bores,
an inlet passageway connected to said inlet,
a plurality of piston members carried respectively in each of said bores and reciprocably movable endwise a full stroke between limiting end position defined by said stops,
lubricant passageway means, including valve means, interconnecting said inlet passageway, said bores and said outlet and arranged such that pressurized lubricant applied to said inlet will produce successive sequential reciprocating movement of said piston members from one of their respective limiting end positions to the other,
    said valve means comprising a plurality of individual valve members associated respectively with one of said bores and each operative in response to the position of its respective piston member in its bore to establish a flow path through such valve members to admit lubricant into its respective bore from said inlet passageway,
    each of said valve members being so constructed and arranged as to be operative to establish said flow path only when its respective piston member is situated with respect to one of its respective stops a distance less than 15 percent of the length of said full stroke of its respective piston member, regardless of the lubricant fluid pressure at any of said outlets.

9. A lubricant distributor comprising,
a distributor body having an inlet,
a plurality of outlets,
a plurality of elongated bores and a pair of spaced stop means at the opposite ends of each of said bores,
an inlet passageway connected to said inlet,
a plurality of piston members carried respectively in each of said bores and reciprocably movable endwise a full stroke between limiting end positions defined by said stops,
lubricant passageway means, including valve means, interconnecting said inlet passageway, said bores and said outlet and arranged such that pressurized lubricant applied to said inlet will produce successive sequential reciprocating movement of said piston members from one of their respective limiting end positions to the other,
said valve means comprising a plurality of individual valve members associated respectively with one of said bores and each operative in response to the position of its respective piston member in its bore to establish a flow path through such valve members to admit lubricant into its respective bore from said inlet passageway,
each of said valve members being so constructed and arranged as to be operative to establish said flow path only when its respective piston member is situated with respect to one of its respective stops a distance less than 15 percent of the length of said full stroke of its respective piston member, each of said valve members comprising, in combination, in its respective bore wall and its respective piston member,
a port having a pair of end walls situated in axially spaced planes extending perpendicularly to the axis of its respective bore, and a land portion having axially spaced end walls shaped complementarily to said end walls of said port.

10. The lubricant distributor of claim 9 in which said ports are situated in said bore walls and said land portions are situated on said piston members.

11. A lubricant distributor comprising,
a distributor body having an inlet,
a plurality of outlets,
a plurality of elongated bores and a pair of spaced stop means at the opposite ends of each of said bores,
an inlet passageway connected to said inlet,
a plurality of piston members carrier respectively in each of said bores and reciprocably movable endwise a full stroke between limiting end positions defined by said stops,
lubricant passageway means, including valve means, interconnecting said inlet passageway, said bores and said outlet and arranged such that pressurized lubricant applied to said inlet will produce successive sequential reciprocating movement of said piston members from one of their respective limiting end positions to the other,
    said valve means comprising a plurality of individual valve members associated respectively with one of said bores and each operative in response to the position of its respective piston member in its bore to establish a flow path through such valve members to admit lubricant into its respective bore from said inlet passageway,
    each of said valve members being so constructed and arranged as to be operative to establish said flow path only when its respective piston member is situated with respect to one of its respective stops a distance less than 15 percent of the length of said full stroke of its respective piston member,
    each of said valve members comprising, in combination, in its respective bore wall and its respective piston member,
    a port,
    a circumferentially annular ring groove in communication with said port and having axially spaced end walls,
    and a land portion having axially spaced end walls shaped complementarily to said end walls of said groove.

12. The lubricant distributor of claim 11 in which said ports and said grooves are situated in said bore walls and said land portions are situated on said piston members.

13. A lubricant distributor comprising, a distributor body having a stack of individual block-units disposed in side-by-side assembled relation and including
an inlet block-unit,
an end block-unit, and
a plurality of intermediate block-units between said inlet and said end block-units,
    each having at least one mating face formed thereon to engage in abutting relation with a mating face of an adjacent block-unit,
an inlet formed in said inlet block-unit,
a plurality of outlets formed in said intermediate block-units,
an elongated bore and a pair of spaced stops at the opposite ends of said bore formed in each of said intermediate block-units,
a piston member carried in each of said bores and reciprocally movable between limiting end positions defined by said stops,
a plurality of first passageways formed respectively in said inlet block-unit and in each of said intermediate block-units to form an inlet passageway in said body in communication with said inlet,
    each of said first passageways opening to a mating surface of its respective block-unit wherein the openings of said first passageways formed in the mating surfaces of adjacent block-units are in register with one another, lubricant passageway means, including valve means, interconnecting said inlet passageway, said bores and said outlet and arranged such that pressurized lubricant applied to said inlet will produce successive sequential reciprocating movement of said piston members from one of their respective limiting end positions to the other, said valve means comprising a plurality of individual valve members associated respectively with one of said bores and each operative in response to the position of its respective piston member in its bore to establish a flow path through said valve member to admit lubricant into its respective bore, said lubricating passageway means comprising a plurality of second passageways formed respectively in said block-units with each of said second passageways opening to a mating surface of its respective block-unit and wherein the openings of said second passageways formed in mating surfaces of adjacent block-units are in register with one another, a plurality of counterbores formed in at least one of the mating surfaces of each of the pairs of adjacent block-units surrounding, respectively, the passageway openings formed in said mating surfaces, a plurality of O rings having a free state configuration and a compressed state configuration disposed respectively in each of said counterbores to provide a seal around the registered openings of said passageways while providing lubricant flow between such registered openings, the diameter of each of said counterbores being greater than the diameter of the corresponding passageway opening it surrounds and the depth of each of said counterbores being less than the free state axial dimension of the O ring disposed therein whereby each of said O rings in its free state configuration projects outwardly beyond the corresponding mating surface of its respective block-unit, and means for clamping and maintaining the block-units together in side-by-side assembled relation to deform the O rings to their compressed state configuration and to bring the mating faces of adjacent block-units into abutting engagement with one another, the inner diameter of each of said O rings in the compressed state configuration thereof being greater than the diameter of the corresponding registered passageway openings which it surrounds in order to provide lubricant flow between such registered openings.

References Cited by the Examiner

UNITED STATES PATENTS

| | | | |
|---|---|---|---|
| 2,027,171 | 1/1936 | Hillis | 184—7 |
| 2,146,424 | 2/1939 | Dirkes | 184—7 |
| 2,331,924 | 10/1943 | Nemetz | 184—7 |
| 2,792,911 | 5/1957 | Harter. | |

LAVERNE D. GEIGER, *Primary Examiner.*

MILTON KAUFMAN, *Examiner.*